United States Patent

[11] 3,565,095

| [72] | Inventor | Ralph W. Zeigler<br>Marshalltown, Iowa |
|---|---|---|
| [21] | Appl. No. | 738,324 |
| [22] | Filed | June 19, 1968 |
| [45] | Patented | Feb. 23, 1971 |
| [73] | Assignee | Fisher Governor Company<br>a corporation of Iowa |

[54] AUTOMATIC SWITCH-OVER SYSTEM
4 Claims, 6 Drawing Figs.

[52] U.S. Cl. .................................................. 137/115,
137/116, 137/116.3
[51] Int. Cl. .................................................. G05d 7/01
[50] Field of Search .......................................... 137/110,
115, 116, 116.3; 73/195, 197

[56] References Cited
UNITED STATES PATENTS

| 2,832,367 | 4/1958 | Auwerter ...................... | 73/197 |
| 2,862,387 | 12/1958 | Webster ........................ | 137/115 |
| 2,949,125 | 8/1960 | Gilmore ....................... | 137/110 |
| 3,213,875 | 10/1965 | Spence ........................ | 137/110 |

Primary Examiner—William F. O'Dea
Assistant Examiner—William H. Wright
Attorney—Molinare, Allegretti, Newitt & Witcoff ABSTRACT: An automatic switchover system for switching all or part of the flow of gas or liquid from one fluid conduit to another parallel fluid flow conduit so as to match the actual flow rate to the most desirable flow rate for each of the fluid flow conduits. A pressure regulator mechanism is provided in each of the fluid flow conduits and the regulators are controlled by loading pressure from a pilot. A three-way valve is associated with one of the pressure regulator mechanisms and impulse means is associated with the other pressure regulator mechanism. The three-way valve is adapted to direct the flow of loading pressure between the first regulator mechanism and the second regulator mechanism.

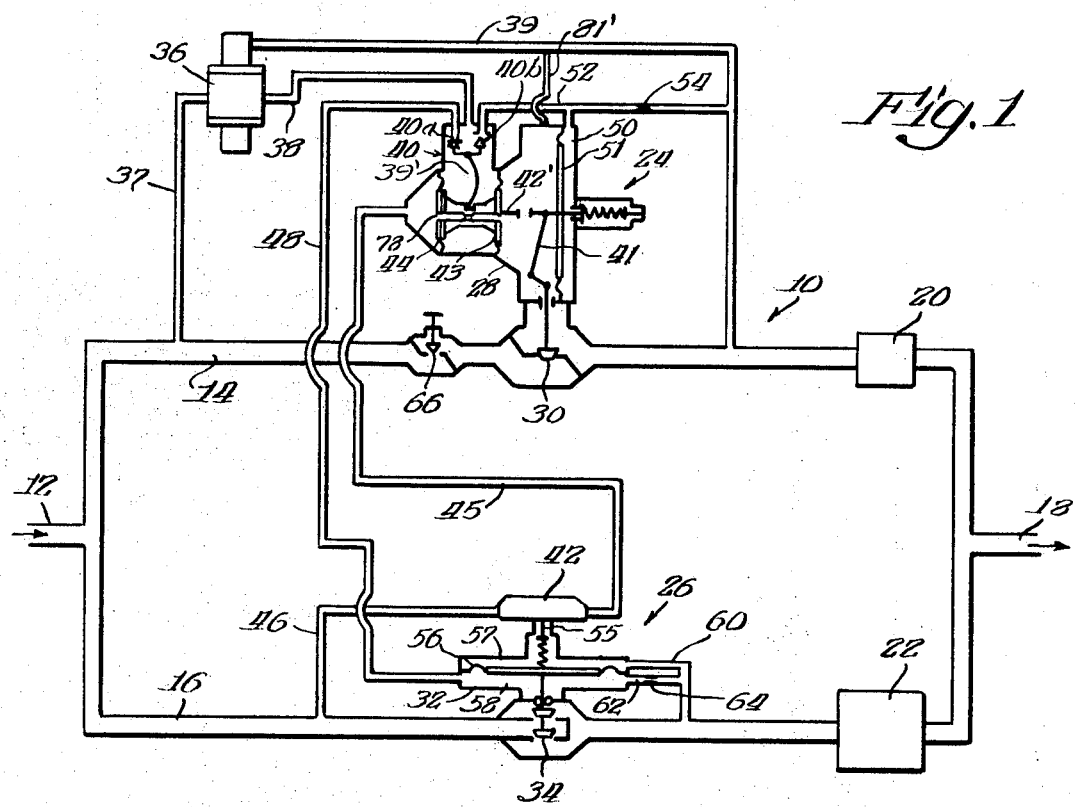
Fig. 1
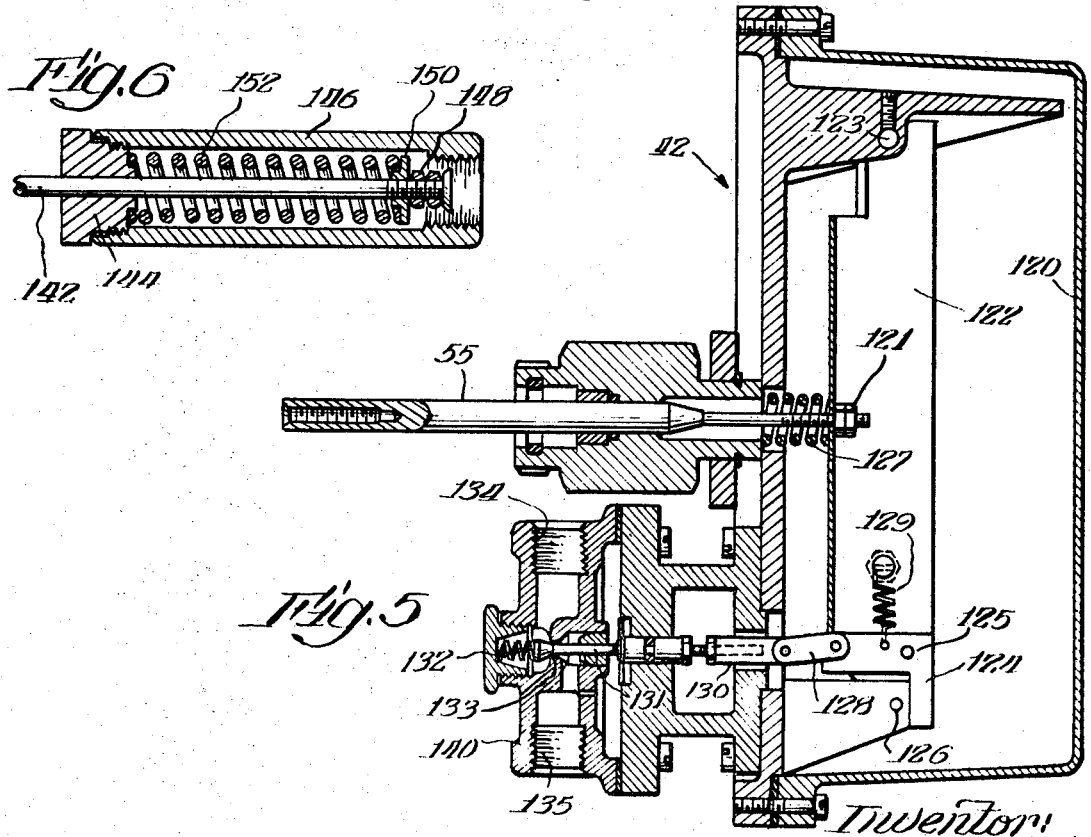
Fig. 6
Fig. 5
Inventor:
Ralph W. Zeigler
By Bair, Freeman & Molinare Attys

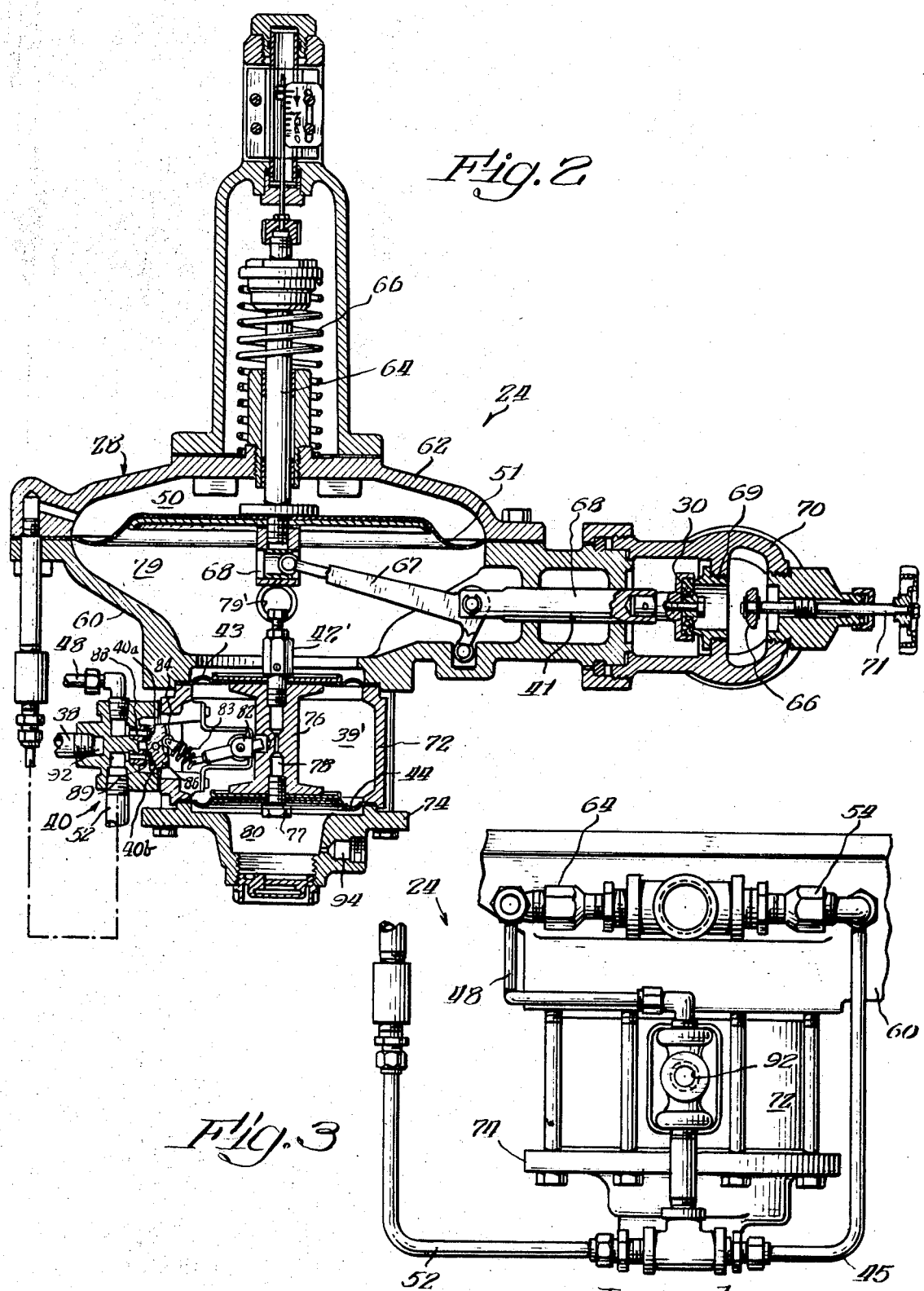

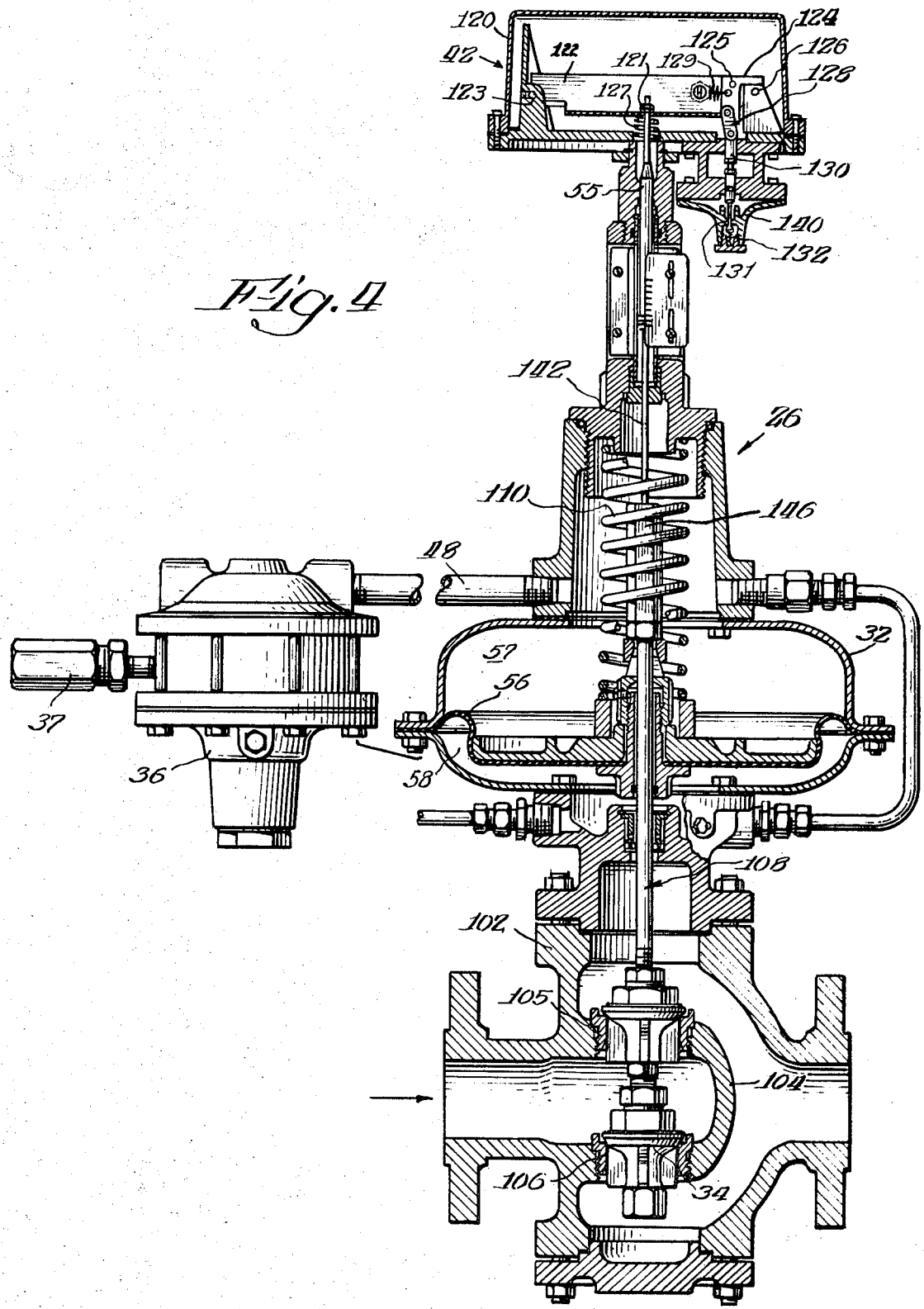

AUTOMATIC SWITCH-OVER SYSTEM

BACKGROUND OF THE INVENTION

This invention relates to an automatic switchover system for controlling the flow of fluid through parallel fluid flow conduits and, more particularly, to an automatic switchover system for switching all or part of the flow of gas or liquid from one conduit to another conduit so as to match the actual flow rate to the most desirable rate for each of the conduits.

In known parallel conduit systems employed for example, in gas distribution systems or industrial regulator stations, the range of flow desirable for one conduit is limited on the high side by the maximum capacity of a meter or regulator utilized in such conduit. The conduit may be a metering run wherein a meter is used or the conduit may be provided with a regulator and function as a pressure reducing station. The minimum desired rate of fluid flow in the conduit is determined for accurate measurements by the meter in the metering station, or the minimum flow for accuracy, economy and stable regulation in a pressure reducing station. The ratio of the maximum to the minimum desirable flow through a regulator or a meter is defined as "rangeability."

High capacity meters generally have a high cost and a large physical size if they are capable of providing high rangeability. The diaphragm type meter has virtually infinite rangeability because it can measure fluid flows down to a zero flow rate. Rotary meters, turbine meters and orifice meters are less costly and are smaller in size. However, the minimum flow rate for accurate measurement moves upward, and, therefore, the rangeability moves downward. Inaccuracy at low flow rates becomes more of a problem.

Rangeability is also a factor in sizing of regulators. A high capacity regulator in a fast system (where the downstream volume is small) may be incapable of regulating smoothly at extremely low flow rates unless the gain of the regulator is reduced. Reduction in the gain results in a reduction in the accuracy of pressure regulation.

In large metering stations using orifice meters, the rangeability problem is usually solved by the use of differential pressure controllers actuating shutoff valves in each of the parallel runs. As the flow rate increases to the capacity of one meter run, the flow controller initiates action by a meter run shutoff valve to open an additional parallel run. This is a practical solution when the meter rangeability is low and when the bleed of gas from the apparatus is permissible.

Another method of splitting high flow through a station is to have a pressure regulator on each of the runs. The regulators are set for different pressures and as flow increases to the capacity of one, the pressure falls to the setting of the second. This system is useful if flow rates are always either very low or very high. If the flow rates are just above the capacity of the first regulator, the second regulator must start at very low flows and a high rangeability is still required. Also the delivery pressure must necessarily change and this could be undesirable.

Other systems have utilized many pieces of costly regulating equipment and have required a controlled pressure that is different in the low flow condition than that maintained in the high flow condition.

An object of this invention is to provide an improved automatic switch-over system wherein the deficiencies and disadvantages of prior systems are obviated.

Another object of the present invention is to provide an improved automatic switchover system incorporating pressure regulators in each of two parallel runs, such system being relatively simple and requiring a minimum of field adjustments.

A further object of the present invention is to provide an automatic switch-over system incorporating pressure regulators in each of a pair of parallel runs, with a single pilot being provided for alternately controlling the pressure regulators so as to insure a constant delivery pressure.

Another object of this invention is to provide an improved automatic switch-over system embodying pressure regulators in each of a pair of parallel runs or conduits, the regulators being responsive to a loading pressure from a single pilot, and with three-way valve means and impulse means being provided to selectively port loading pressure from one regulator to the other. Other objects of the present invention will become more apparent hereinafter.

BRIEF DESCRIPTION OF THE DRAWING

A presently preferred embodiment of the present invention is illustrated in the attached drawing wherein:

FIG. 1 is a schematic diagram of an automatic switchover system embodying the present invention;

FIG. 2 is a cross-sectional view of one of the regulator means of the present invention and illustrating the three-way valve which forms a part thereof;

FIG. 3 is an elevational view of the regulator means of FIG. 2 illustrating the piping thereof;

FIG. 4 is a cross-sectional view of the other regulator means used in the automatic switchover system of FIG. 1;

FIG. 5 is a cross-sectional view of the impulse means secured to and forming a part of the regulator means shown in FIG. 4; and FIG. 6 is a detail view of a compensating device utilized to secure the stem of the impulse means to the regulator stem in the device of FIG. 4.

Referring now to FIG. 1, there is illustrated an automatic switchover system 10 embodying the present invention. Fluid is supplied from a source through a conduit 12 to parallel fluid flow conduits or runs 14 and 16. The conduits 14 and 16 are joined as indicated at 18 so as to supply a constant downstream pressure to a point of use as will be more fully discussed hereinafter. Provided in each of the conduits 14 and 16 are meter means 20 and 22. The meter means may comprise a positive displacement meter 20 in the run 14 and a rotary or a turbine meter 22 in the run 16.

The flow of fluid, which may be either gas or liquid, through the conduits 14 and 16, respectively, is controlled by a first regulator means indicated generally by the numeral 24 flow of fluid through the conduit 16 is controlled by a second regulator means indicated generally by the numeral 26. The regulator means 24 includes a regulator 28 operatively connected to a valve 30 for controlling flow through run 14. The second regulator means 26 incorporates a regulator 32 operatively connected to valve means 34, which may be, as shown in the embodiment of FIG. 1 a double seated valve plug.

A pilot 36 is provided for supplying loading pressure to the regulator means 24 and 26. Conduit 37 communicates regulated imput pressure to the pilot 36 from the conduit 14. The conduit 38 connects the pilot 36 to the regulator 28 for supplying loading pressure thereto. Conduit 39 connects the pilot 36 to the conduit 14 downstream of the regulator means 24. The loading pressure may be selectively ported from the regulator 28 to the regulator 32 by means including the three-way valve mechanism indicated generally by the numeral 40 and the impulse means indicated generally by the numeral 42. Chamber 39' of regulator 28 is connected with regulator 32 by conduit 48 and with a chamber 50 in regulator 28 and with the conduit 39 by conduit 52 which has a restriction 54 provided therein.

The output or loading pressure from the pilot 36 flows through the conduit 38 to the chamber 39' in regulator 28 between the diaphragms 43 and 44. The three-way valve 40 is adapted to be actuated in one direction by the mechanical action of the linkage 41 connected to the valve 30 engaging with and moving a control stem 42'. The three-way switch is actuated in the opposite direction by a pressure impulse from impulse means 42 through conduit 45 against diaphragm 44 of the three-way valve or switch 40.

The impulse switch 42, which is mounted on and forms a part of the second regulator means 26 will act to put out a pressure signal if the valve means 34 decreases its degree of opening to a predetermined value. The impulse switch 42 is communicated with run 16 by conduit 46 and with regulator 28 by conduit 45. The second regulator 32 has a diaphragm 56 therein defining chambers 57 and 58. Chamber 57 is communicated with run 16 via conduit 60 and chamber 58 is communicated with conduit 61 via conduit 62 having a restriction 64 therein.

Basically, the pilot 36 acts to maintain the pressure in the downstream system at a constant value by reducing whatever pressure is necessary to one or the other of the main control valves 30 and 34. The restriction valve 66 provided in conduit 14 functions to establish a predetermined flow rate value at which switchover from run 14 to run 16 takes place.

Considering the operation of the automatic switchover system, a regulated inlet pressure is supplied to run 14 and to pilot 36. Restriction valve 66 is manually adjusted to a predetermined switchover valve. Loaded pressure from the pilot 36 is supplied to chamber 39' of the regulator through conduit 38. At this time the valves 40a and 40b are in the position illustrated and fluid will flow through conduit 52 to chamber 50 in regulator 28 to apply pressure to diaphragm 51 to actuate linkage 41 so as to position valve 30 controlling run 14. As the demand for gas increases, the pusher post of linkage 41 will move toward the stem member 42'. At the maximum flow rate desired through meter 20, the restricting valve 66 will begin to limit the total quantity of gas flowing through valve 30 of the regulator means 24.

The limiting effect caused by the restriction of the opening of valve 30 will cause the downstream pressure to fall slightly and therefore the controlling pressure pilot 36 will increase its output to move the pusher post of linkage 41 until it contacts the stem 42' and moves the diaphragm assemblies 43 and 44, and the interconnecting spool assembly to the left as viewed in FIG. 1 to open valve 40a and close valve 40b.

This action causes the loading pressure from pilot 36 to be directed to the regulator means 26 in the large metering line 16. The loading pressure from chamber 50 bleeds downstream through the restriction 54 allowing the spring in regulator 28 to return control valve 30 to the shutoff condition. The pilot 36 may be a Type 61 pilot made by Fisher Governor Company. Such pilot furnishes pressure balanced control and is readily adjusted by changing the compression of the pilot control spring therein (not shown).

The impulse switch 42 mounted on regulator 32 includes a stem 55 attached to the control valve plug 34 and movable upwardly as the valve opening increases. The diaphragm 56 is moved upwardly as viewed in FIG. 1 due to pressure increase in the chamber 58 below the diaphragm 56.

When diaphragm 56 moves downwardly to a predetermined position, the impulse switch 42 is actuated to cause a pulse to be delivered through conduit 45 to the chamber to the left of the diaphragm 44 in regulator 28. The increase of pressure causes the diaphragm assemblies 43 and 44 to move to switch the three-way switch 40, causing the valve 40a to close and the valve 40b to open. Loading pressure on the diaphragm 56 of the regulator 32 bleeds downstream through restriction 64 and the valve plug 34 will move toward the closed position. Pressure in the chamber 50 of regulator 28 increases to bring the small control valve plug 30 into a proper throttling position for the flow required.

The pressure regulator means 24 and 26 themselves effect switching from one run to the other instead of having other devices to do this work.

Now that the overall system operation has been briefly reviewed, consideration will be given to the major components of the system. Referring to FIGS. 2 and 3, there is illustrated the regulator means 24. The regulator 28 includes a body portion or lower casing 60 having a cover or upper casing 62 secured thereto by suitable bolt means. Diaphragm 51 is sandwiched between the body portion 60 and cover 62 so as to define a chamber 50 between the diaphragm and the cover 62. Connected to the diaphragm 51 for movement therewith is a rod 64 which is adapted to be biased upwardly as viewed in FIG. 2 by the spring 66. The rod 64 is connected at its lower end to a pusher post 68. An end of the lever 67 of linkage 41 is pivotally secured to the pusher post 68 and is pivoted within the body 60. The linkage 41 also includes a valve rod 68 attached to the link or lever 67 at one end and to the valve 30 at the other end so that upon movement of the diaphragm 51 and linkage 41. the valve 30 will be moved with respect to the valve seat 69 so as to control the flow of fluid through the run 14.

It will be noted that the restriction valve 66 is included in a housing portion or valve body 70 secured to the lower casing 60 and is, therefore, integral within the regulator means 24 rather than separate from the regulator 28 as schematically in FIG. 1. The valve stem 71 may be threaded inwardly and outwardly so as to position the restriction plug 66 with respect to an end of valve seat 69 to establish a predetermined switching point at which control will switch from the conduit 14 to the conduit 16.

Secured to the lower portion of the body 16 is an annular housing part 72 and a cap member 74 which is secured to the body 60 so as to retain the annular housing portion 72 and the cap in place on the body 60. The diaphragms 43 and 44 are retained in spaced-apart relationship between the annular housing 72 and the respective abutment shoulders of the body portion 60 and the cap 74. The diaphragms 43 and 44 are interconnected by a switching spool assembly 76. The pusher post 42' extends from one end of the switching spool assembly and is adapted to be engaged by the pusher post 68 as will be more fully set forth hereinafter and the machine screw 77 is adapted to be secured at an opposite end of the switching spool assembly for retaining the diaphragm assembly 44 in engagement with the switching spool assembly 76. A restricted passageway 78 is provided through the switching spool assembly so as to communicate the chamber 79 defined between diaphragm assembly 51 and body 60 with the chamber 80 defined between the diaphragm assembly 44 and the cap 74. Pressure in chamber 80 is thus bled back to the downstream system via passage 78 in the spool assembly 76, chamber 79, and suitable passage means to the downstream system, for example, clearance between rod 68 and the bearing surfaces therefor in housing part 60. Preferably, chamber 79 is connected to line 39 via port 79' and line 81'. The pressure from the impulse switch 42 is bled downstream to permit free operation of the diaphragm assemblies 43 and 44.

The switching spool assembly 76 is provided with a recess at one end thereof adapted to engage with and operate a toggle lever 82. The toggle lever 82 cooperates with a spring 83 and cam 84, the cam being adapted to abut the valve disc 86 which carries the valve seats 40a and 40b. The valve 40a is adapted to cooperate with the port 88 leading to the conduit 48 and the port 89 is adapted to communicate with the line 52. The line 48 carries loading pressure from the chamber 39' to the chamber 32 and the line 52 ports loading pressure to the chamber 50 and then to the downstream side of the regulator means 24 as indicated schematically in FIG. 1. Loading pressure is supplied from the pilot 36 through the line 38 to the port 92 which is communicated by an internal passage (not shown) to the chamber 39'.

It is to be noted that the chamber 80 within the regulator means 24 is adapted to communicate with the conduit 45 via the port 94 in the cap 74.

The operation of the regulator means 24 is as follows. Loading pressure is supplied from the pilot through the conduit 38 and the port 92 to the chamber 39'. Pressure is applied from the chamber 39' between the diaphragms 43 and 44 through the orifice 89 to the loading chamber 50. A pressure increase in the chamber 50 will cause diaphragm 51 to move downwardly actuating the linkage 41 to open the valve 30. As the demand for gas increases, the pusher post 68 moves toward the post 42'. At the maximum flow rate through the meter 20 in the run 14, the restricting plug 66 begins to limit the total quantity of gas flowing from the inlet chamber of the control valve body through the orifice 69 to the outlet.

The limiting effect caused by the restriction of the opening will cause the pressure downstream of the regulator means 24 in run 14 to fall slightly and, therefore, the controlling pressure pilot 36 will increase its output to move the pusher post 68 further downward until it engages the cap screw at the end of the pusher post 42 and moves the diaphragm assemblies 43 and 44 and the switching spool assembly 76 connected therebetween downwardly. The toggle lever 82 then switches downward causing the valve disc 86 to rotate and close the orifice 89 and open the orifice 88. Loading pressure will now be directed from the chamber 39' through the port 88 and the conduit 48 to the regulator means 26 in the conduit 16. The loading pressures from chamber 50 bleeds downstream through the restriction 54 (FIG. 1) allowing the spring 66 to actuate the linkage 41 to move the valve 30 to a shutoff condition.

The valves 40a and 40b are returned to their initial position by application of an impulse pressure from the impulse switch 42 to the chamber 80 which increases the pressure in the chamber 80 against the diaphragm 44 and causes movement of the diaphragm assemblies 43 and 44 upwardly as viewed in FIG. 2. This, in turn, causes movement of the switching spool assembly 76 which actuates the valve disc 86 to return the valves to the position illustrated in FIG. 2.

Turning to FIG. 4, there is illustrated the regulator means 26. The regulator 32 includes a housing sandwiching a diaphragm assembly 56 therein so as to define chambers 57 and 58 within the regulator.

Secured to the regulator 32 is a valve body 102 having a flow passage therethrough which forms a part of the run 16. Provided in the wall 104 in the valve body are a pair of valve seats 105, 106 which are adapted to be engaged by the double valve plug 34. The double valve plug 34 is secured to a valve stem means 108 which is adapted to be operatively connected to the diaphragm assembly 56.

Provided within the regulator 32 is a spring 110 which is adapted to bias the diaphragm assembly 56 downwardly.

The impulse means 42 of the present invention is adapted to be connected to the housing of the regulator 32. Reference may be made both to FIGS. 4 and 5 for a better understanding of the impulse means. The stem 55 is attached to the large control valve plug 34 and moves upwardly as the valve opening increases. As the valve 34 opens, the stem 55 travels toward the switch case cover 120 and the lock nuts 121 at the upper end of the stem 55 move away from the lever 122.

When the load decreases the stem 55 travels away from the switch case cover 120 and the lock nuts 121 engage the lever 122 causing it to pivot about the pivot pin 123. The L-shaped lever 124 fastened to the lever 122 by pivot pin 125 strikes the pivot rod 126. The spring 127 begins to be compressed, but the lever 122 continues to travel downwardly. As the pivots in the link 128 line up on the vertical axis of the pusher post 130, force is transmitted to the impulse valve plug 131. The valve plug 131 travels downwardly, compressing the spring 132 and opening the orifice 133 to allow a short duration spurt of gas flow from inlet 134 to the outlet 135. The inlet 134 communicates with line 46 (FIG. 1) and the outlet 135 communicates with line 45 (FIG. 1). As the upper end of the link 128 and the cooperating end of the lever 124 continue to travel, spring 132 now returns plug 131 and closes orifice 133 because of the buckling action of the linkage assembly. The body 140 in FIG. 4 is rotated 90° from the body as shown in FIG. 5 to better show the body construction.

As explained hereinabove, the momentary opening of the impulse valve plug 131 increases the pressure in the chamber 80 of regulator means 24 through the port 94. This applies a force on the diaphragm 44 moving the switching spool assembly 76 upwardly and closing the orifice 88 while opening the orifice 89. Loading gas on the diaphragm 56 of the regulator means 26 bleeds through the restriction 64 and the valve 34 moves toward the closed position. Pressure in the small control valve loading chamber 50 increases to bring the small control plug 30 into a proper throttling position for the flow required.

The toggle mechanism in the impulse switch 42 is in the buckled position when the large control valve 34 is closed. When excess flow through the small control valve 30 calls for a switch to the large control valve 34, a small upward movement of the large control valve plug and the attached stem 55 allows the toggle mechanism to move upward far enough so that the small tension spring 129 can return the toggle mechanism to the position shown in the drawing. The impulse switch 42 is then ready for the next operating cycle.

The compensating device shown generally in FIG. 4 and in cross section in FIG. 6 is adapted to be connected between the valve stem means 108 and the actuating stem 55 of the impulse switch 42 to prevent damage to the parts in the case of over-travel downward of the valve stem means 108. The indicator rod 142 of the valve stem means 108 extends through end nut 144 connected to body part 146 and is connected at the upper end to stem 55. The lower end of rod 142 is threaded to receive nuts 148 for returning washer 150 in the rod 142. Spring 152 is disposed on the rod between washer 150 and end nut 144.

The automatic switchover system of the present invention provides a simple solution to the problem of switching parallel pressure regulators. Adjustments to the system are readily made by positioning the restricting plug 66 so as to obtain a desired predetermined switchover point from the run 14 to the line 16. A second relatively simple adjustment is that of the lock nuts 121 in the impulse switch so as to establish a predetermined value at which the impulse will be provided to the regulator 28 by the impulse switch 42. Only one pressure adjustment is necessary, that being the adjustment of the compression spring in pilot 36. The controlled pressure remains virtually constant in the automatic switchover system of the present invention regardless of whether the flow is through the large or the small run.

While I have described a preferred embodiment of my invention, it will be understood that the invention is not limited thereto, but may be otherwise embodied within the scope of the following claims.

I claim:

1. An automatic switchover system including parallel fluid flow conduits comprising first flow control means in one flow conduit and second flow control means in the other flow conduit, the first and second flow conduits being adapted to be connected to a source of fluid, meter means in each of the fluid flow conduits, operating means for regulating the first and second control means to maintain the pressure downstream of the parallel fluid flow conduits at a constant value, and adjusting means associated with the said one flow conduit for establishing a predetermined value at which switchover from the one flow conduit to the other flow conduit takes place, said first flow control means comprising a first pressure regulator and the second flow control means comprising a second pressure regulator and the operating means comprising a pilot in one of the fluid flow conduits operatively communicating the first and second pressure regulators, the adjusting means comprising a valve in the said one flow conduit for setting a predetermined switching point for restricting flow through the said one flow conduit and applying loading pressure from the pilot to the second regulator means, the switching point being correlated with the maximum flow rate desired through the meter means in said one flow conduit.

2. An automatic switchover system as in claim 1 wherein the first flow control means includes a first valve for controlling fluid flow in one fluid flow conduit and the second flow control means includes a second valve for controlling fluid flow in the other fluid flow conduit, said operating means including a three-way valve associated with said first pressure relator and an impulse means associated with the second pressure regulator, the three-way valve selectively directing loading pressure between the first regulator means and the second regulator means.

3. An automatic switchover system as in claim 2 including second adjusting means for setting a predetermined switching point at which the loading pressure is applied to the first regulator means.

4. An automatic switchover system as in claim 3 wherein the second adjusting means is part of the impulse means.